United States Patent [19]

Tsunoda

[11] 4,318,004
[45] Mar. 2, 1982

[54] METHOD OF PUMPING UP ELECTRIC POWER GENERATION AND AN APPARATUS THEREFOR

[75] Inventor: Sachio Tsunoda, Yokohama, Japan

[73] Assignee: Tokyo Shibaura Denki Kabushiki Kaisha, Kawasaki, Japan

[21] Appl. No.: 31,786

[22] Filed: Apr. 20, 1979

[30] Foreign Application Priority Data

May 2, 1978 [JP] Japan .................................. 53-53039

[51] Int. Cl.³ .............................................. F03B 3/10
[52] U.S. Cl. ...................................... 290/52; 415/500
[58] Field of Search ................ 290/52, 1 R; 415/500; 60/398, 413, 408, 486

[56] References Cited

U.S. PATENT DOCUMENTS 3,891,860 6/1975 Hutarew ............................... 290/52

FOREIGN PATENT DOCUMENTS 1503264 5/1970 Fed. Rep. of Germany .

Primary Examiner—R. L. Moses
Assistant Examiner—Shelley Wade
Attorney, Agent, or Firm—Oblon, Fisher, Spivak, McClelland & Maier

[57] ABSTRACT

Disclosed are a method of pumping up electric power generation and an apparatus therefor which comprises a single-speed reversible pump-turbine and a booster pump, hydraulically coupling and driving the pump-turbine in series with the booster pump to perform pumping with the sum of respective pump total heads of the pump-turbine and the booster pump, and generating electric power by an average turbine net head affecting the pump-turbine without employing the booster pump, the ratio of the average pump total head to the average turbine net head of the pump-turbine being selected at the range from 0.82 to 1.0 and the ratio of average pump total head of the booster to the average turbine net head being selected at the range of from 0.23 to 0.05.

2 Claims, 2 Drawing Figures

METHOD OF PUMPING UP ELECTRIC POWER GENERATION AND AN APPARATUS THEREFOR

BACKGROUND OF THE INVENTION

This invention relates to a method of pumping up electric power generation and an apparatus therefor employing a single-speed reversible pump-turbine in which the direction of a water current is reversed when the operation mode is switched between generating or turbine operation and pumping or pump operation.

Pumped storage power plants, which have conventionally been constructed and in use, are confronted by a keen demand for high-efficiency operation of their pump-turbines from an economical point of view, the pump-turbine and the method of operation thereof requiring review. Now there will be given an outline of the arrangements of such conventional pumped storage power plants and the method for operating the same.

A reversible pump-turbine generally used in one such pumped storage power plant is operated as a pump (hereinafter referred to as pump operation) and also as a turbine (hereinafter referred to as turbine operation) by reversing the rotating direction of a runner and a rotating part coupled thereto. Let it be supposed that the rotating speed of the runner, pump total head and efficiency for the pump operation are Np (rpm), Hp (m) and $\eta p$, respectively, and that the rotating speed of the runner, turbine net head and efficiency for the turbine operation are Nt (rpm), Ht (m) and $\eta t$, respectively. FIG. 1 shows respective efficiency curves or envelope curves $\eta p$ and $\eta t$ of unit speeds per one meter head $Np/\sqrt{Hp}$ and $Nt/\sqrt{Ht}$ for the pump and turbine operations of the pump-turbine, obtained by varying the guide vane opening of the pump-turbine. As may be seen from the drawing of FIG. 1, the pump and turbine operations show different unit rotating speeds for the maximum efficiency; the maximum efficiency (point P) is obtained where Hp = Hpo, that is, where the unit speed per one meter head is $Np/\sqrt{Hpo}$ in the pump operation, whereas in the turbine operation the maximum efficiency (point Q) is attained where Ht = Hto, that is, where the unit speed per one meter head is $Nt/\sqrt{Hto}$. As long as the reversible pump-turbine is used, it is hydraulically inevitable that the maximum-efficiency unit rotating speeds for those two operation modes will be different from each other. Although a great deal of effort has been made to minimize such difference, the ordinary ratio between both unit speeds per one meter head is at present approximately 1.1. That is, $$\frac{Np/\sqrt{Hpo}}{Nt/\sqrt{Hto}} \cong 1.1. \tag{1}$$

Moreover, it may be seen from FIG. 1 that the efficiency of the pump-turbine is considerably low in both cases where the pump-turbine is operated as a pump at a unit speed per one meter head of $Nt/\sqrt{Hto}$ and where it is operated as a turbine at a speed of $Np/\sqrt{Hpo}$.

Meanwhile, the direction of a water current flowing through the reversible pump-turbine in the pump operation is opposite to that in the turbine operation. Therefore, if the pump-turbine is operated with a give static head Hst (water level difference between upper and lower reservoirs while the pump-turbine is not in operation), the turbine net head Ht for the turbine operation and the pump total head Hp for the pump operation are calculated as follows:

$$Ht = Hst - \Delta Ht,$$

$$Hp = Hst + \Delta Hp. \tag{2}$$

Here $\Delta Ht$ is a head loss of a waterway in the turbine operation, while $\Delta Hp$ is a head loss of the waterway in the pump operation.

As is evident from eq. (2), the turbine net head Ht, with the fixed static head, is smaller than the pump total head Hp by Hp − Ht or $\Delta Hp + \Delta Ht$. The value of $\Delta Hp + \Delta Ht$ varies with the waterway conditions of pumped storage power plants. In actual pumped storage power plants where the static head Hst varies during operation of the pump-turbine, however, the ratio of the average $\overline{Hp}$ of the pump total head Hp to the average of Ht of the turbine net head Ht on the pump-turbine is usually about 1.05. That is, $$\overline{Hp}/\overline{Ht} = 1.05 \tag{3}$$

In most pumped storage power plants, therefore, the reversible pump-turbine may function with the maximum efficiency both in pump and turbine operations for such average head condition only if Np and Nt are so determined as to have the following relationship obtained by substituting the condition of eq. (3) into eq. (1).

$$Np/Nt \cong 1.13. \tag{4}$$

Namely, in this case, it is necessary to employ a two-speed reversible pump-turbine of which rotating speed for turbine operation is lower than that for pump operation.

In order to actualize the aforesaid two-speed operation system, there was proposed such a method that the number of poles of a synchronous generator-motor coupled to a runner is changed, though it failed to be widely used because of the generator-motor's complexity.

Thus, the fact is that mainly used is a system such that the reversible pump-turbine is operated at a single speed, with the efficiency of either pump or turbine operation being enevitably low.

SUMMARY OF THE INVENTION

The object of this invention is to provide a method and apparatus for operating with high efficiency a pumped storage power plant and a single-speed reversible pump-turbine used therein.

In order to attain the above object, the method of pumping-up electric power generation of this invention employs a single-speed reversible pump-turbine and a booster pump, and comprises steps of generating electric power by supplying the pump-turbine directly with a water current to flow therein without passing the current through the booster pump to drive the pump-turbine and a generator-motor coupled thereto at time of electric power generation, and, at time of pumping, pumping up water with the sum of respective pumping heads of the pump-turbine and the booster pump, with the booster pump connected in series with a passage of the water current introduced into the pump-turbine which is driven by the generator-motor to rotate and operated with a pump total head created by the pump-turbine in pump operation set substantially as large as a turbine net head affecting the pump-turbine in turbine operation. Further, the pumping-up power generating apparatus of the invention is provided with a single-speed reversible pump-turbine disposed in a waterway connecting an upper reservoir with a lower reservoir, a generator-motor coupled to the pump-turbine and functioning both as a motor and as a generator, a booster pump, a waterway means with gates for connecting the booster pump in series with a passage of a water current flowing through the pump-turbine at time of pump operation of the pump-turbine, and delivering the water current to the lower reservoir without passing the water current through the booster pump at time of turbine operation of the pump-turbine, and a driving unit for driving the booster pump.

According to the above-mentioned method and apparatus, the pump-turbine, in generating electric power, may be driven as a turbine by the turbine net head provided by a water current flowing from the upper reservoir to the lower reservoir through the pump-turbine without passing through the booster pump, thereby rotating the generator-motor for electrical power generation. At time of pumping, on the other hand, the pump-turbine and the booster pump are hydraulically coupled in series in operation, pumping being achieved with the sum of the respective pump total heads of the pump-turbine and the booster pump. In this case, the capacity of the booster pump used may be determined according to the relation between the turbine net head and the pump total head of the pump-turbine, so that a power plant capable of economical pumping-up electric power generation can be embodied by establishing the relation between the pump-turbine efficiency which is determined practically by the relation between the heads and the booster pump capacity, in due consideration of the water level condition of the plant, the ratio of generating time to pumping time, etc.

DETAILED DESCRIPTION OF THE PREFERRED EMBODIMENT

Figure 1:
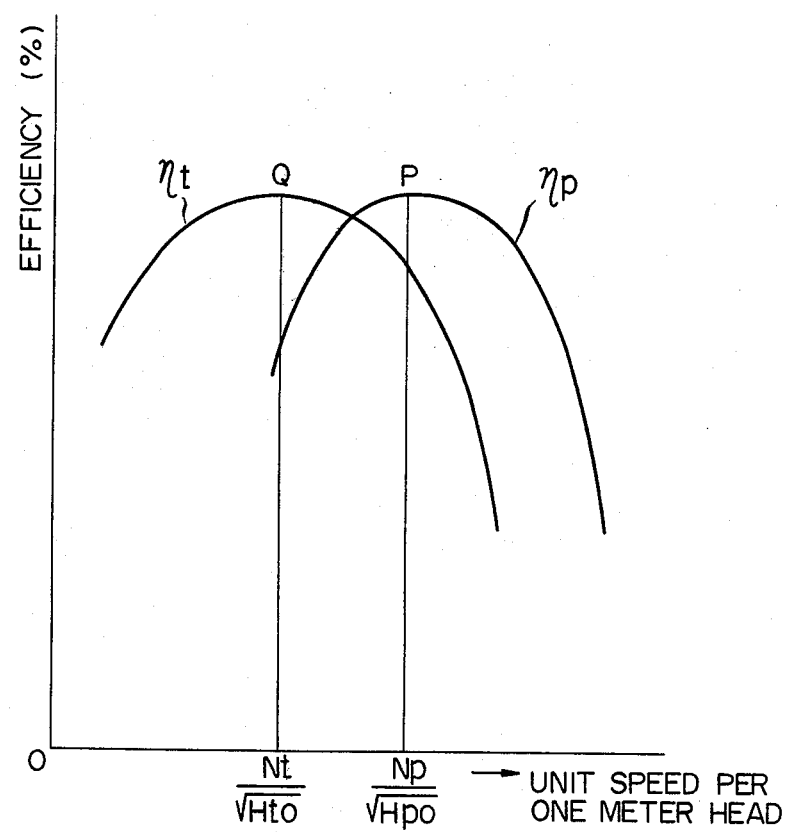
FIG. 1 is a graph showing the relation between the efficiencies of pump and turbine operations of a single-speed reversible pump-turbine.
Figure 2:
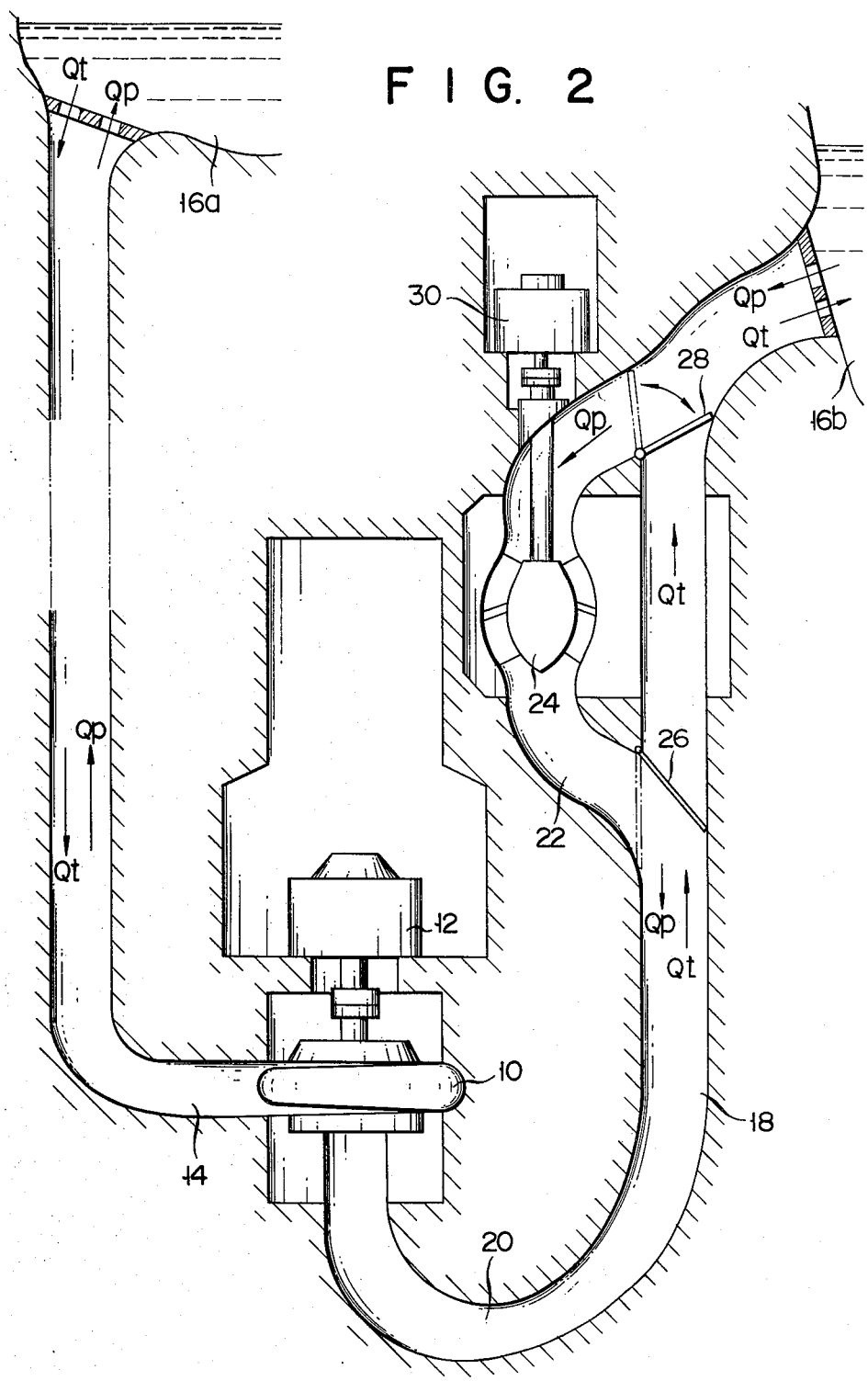
FIG. 2 is a structural drawing of pumped storage power plant arrangements according to an embodiment of this invention.

Referring now to the drawing of FIG. 2, there will be described an embodiment of this invention. FIG. 2 shows a vertical section of underground pumped storage power plant arrangements to which the invention is applied. In this drawing, there are shown a single-speed reversible pump-turbine 10 and a generator-motor 12 directly coupled to the pump-turbine 10. Also, there are shown a pipe line 14 connecting the pump-turbine 10 with an upper reservoir 16a, a lower reservoir 16b, a draft tunnel 18 connecting a draft tube portion 20 with the lower reservoir 16b, a branch pipe 22 bypassing the draft tunnel 18, and a booster pump 24 in the middle of the branch pipe 22. Numerals 26 and 28 designate gates disposed on the pump-turbine 10 side and the lower reservoir 16b side of the branch pipe 22, respectively, and numeral 30 denotes a driving unit for driving the booster pump 24. To simplify the drawing, the connection between the booster pump 24 and the driving unit 30 is omitted, and the booster pump 24 is drawn only symbolically.

Now there will be described the function of the pumped storage power plant arrangements with the above-mentioned construction. First, in the turbine operation of the pump-turbine, the gates 26 and 28 are operated to close the branch pipe 22, thereby connecting the draft tunnel 18 with the lower reservoir 16b, and the pump-turbine 10 is run as a water turbine. In this case, a water current Qt introduced from the upper reservoir 16a is supplied to the pump-turbine 10 by means of the pipe line 14 to drive the pump-turbine 10, and then flows out into the draft tube portion 20. The pump-turbine 10 performs the turbine operation, driving the generator-motor 12 to generate electric power. The current delivered to the draft tube portion 20 flows out into the lower reservoir 16b via the draft tunnel 18. At this time the booster pump 24 is not in operation.

In operating the pump-turbine 10 as a pump, on the other hand, the gates 26 and 28 are shifted to open the branch pipe 22, and a portion of the draft tunnel 18 running in parallel with the branch pipe 22 is closed. Accordingly, the draft tube portion 20 is connected to the lower reservoir 16b via the branch pipe 22 opening in the middle of the draft tunnel 18 and a portion of the draft tunnel 18 on the lower reservoir 16b side. FIG. 2 shows this position. In this case, the pump-turbine 10 is driven by the generator-motor 12, while the booster pump 24 is driven by the driving unit 30. Since the pump-turbins 10 and the booster pump 24 are hydraulically connected in series with each other, a water current $Q_p$, which is sucked from the lower reservoir 16b into the lower reservoir 16b side portion of the draft tunnel 18 by the booster pump 24, flows into the pump-turbine 10 through the branch pipe 22, the portion of the draft tunnel 18 on the pump-turbine 10 side, and the draft tube portion 20, and is pressurized and forced up to the upper reservoir 16a by means of the pipe line 14.

Thus, by using only the pump-turbine 10 as a turbine in the turbine operation and simultaneously serially operating the pump-turbine 10 and the booster pump 24 in the pump operation, a pump head Hp1 required for the pumping operation of the pumped storage power plant may be given as the sum of a pump total head Hp of the pump-turbine 10 and a pump total head Hp2 of the booster pump 24, that is, $$Hp1 = Hp + Hp2. \qquad (5)$$

However, it is important properly to determine the value of a turbine net head Ht compared with the pump total head Hp of the pump-turbine 10, as well as the pump total head Hp2 of the booster pump 24 compared with the values of Hp and Ht.

In performing turbine and pump operations of the pump-turbine 10 at the same rotating speed to obtain the values of Ht and Hp2, the relationship between the pump total head Hp and the turbine net head Ht is estimated to secure the maximum efficiency for each case. To attain this, a relation Np = Nt is introduced into eq. (1), and Hp and Ht are replaced respectively with Hpo and Hto, whereby we obtain $$\frac{Hp}{Ht} = \frac{Hpo}{Hto} \approx \frac{1}{1.1^2} \approx 0.82. \qquad (6)$$

As may be seen from eq. (6), it is necessary to set the pump total head of the pump-turbine 10 much smaller than the turbine net head in order to form the single-speed reversible pump-turbine 10 so as to achieve both the pump and turbine operations with the maximum efficiencies.

On the other hand, from the view-point of improving the performance over all operating range of the single-speed reversible pump-turbine, it is desirable that pump and turbine operations are carried out for maximum efficiency near the respective average head conditions which are used most frequently in operation of the pumped storage power stations.

Therefore, in this invention, the ratio of the average, Hp of the pump total head $\bar{H}p$ to the average, $\bar{H}t$ of the turbine net heat Ht on the pump-turbine is constituted to be the value defined by eq. (6') in order to improve the operation performance of the pump-turbine whereby we obtain $$\bar{H}p/\bar{H}t = Hp_o/Ht_o = 0.82 \qquad (6')$$

Now there will be described a method to determine the average of the pump total head to be borne by the booster pump 24 used with the apparatus of this invention. First, dividing each member of eq. (5) by the average of the turbine net head Ht, we obtain $$\bar{H}p2/\bar{H}t = (\bar{H}p1/\bar{H}t) - (\bar{H}p/\bar{H}t) \qquad (7)$$

Here the first term of the right member, as described in connection with eq. (3), takes the value of approximately 1.05 in most pumped storage power plants, and the second term takes the value of nearly 0.82 according to eq. (6'), so that we obtain $$\bar{H}p2/\bar{H}t = 1.05 - 0.82 = 0.23. \qquad (8)$$

It is evident from the above description that the reversible pump-turbine can be run with the maximum efficiency in both pump and turbine operations by employing as the pump-turbine 10 and the booster pump 24 such ones as to satisfy eqs. (6') and (8), ensuring hydraulically ideal operation of the pump-turbine 10 for all operating range as mentioned above. Also in this case, however, the average pump total head $\bar{H}p2$ of the booster pump 24 is required to take a value as high as 23% of the average turbine net head $\bar{H}t$ of the pump-turbine 10, as given by eq. (8), thereby increasing the hydraulic energy supplied to the water current by the booster pump 24, so that the capacities of the booster pump 24 and the driving unit 30 therefor become too large for the capacity of the main pump-turbine 10, increasing the cost of the generating equipment. According to the apparatus of the invention, therefore, the apparatus as a whole is improved in economical efficiency by slightly relaxing the conditions of eqs. (6') and (8) and using small-capacity one for the booster pump 24. Now there will be described a method for calculating the capacity of the booster pump 24.

While the average pump total head $\bar{H}p2$ need be reduced to decrease the capacity of the booster pump 24, the average pump total head Hp of the pump-turbine is required to be increased correspondingly to such decrease, so that the ratio of the average of the pump total head Hp to the average of the turbine net head will exceed the value of eq. (6'), 0.82. Accordingly, there will be caused an undesirable result—a lowering of the operating efficiency of the pump-turbine. In this invention, $\bar{H}p/\bar{H}t$ is determined within a range not exceeding the value 1.05 of eq. (3) that has conventionally been used, that is, a range $$0.82 < \bar{H}p/\bar{H}t < 1.05, \qquad (9)$$

thereby reducing the booster pump 24 in size. By the use of eq. (9), the pump-turbine efficiency may be improved as compared with the case where the pump and turbine operations are performed at a single speed with the conventional value of $\bar{H}p/\bar{H}t$ maintained, although the aforementioned ideal condition cannot be attained. In order to achieve such improvement, $\bar{H}p/\bar{H}t$ should be selected at a proper value in consideration of the following circumstances.

That is, in the prior art pumped storage power plant provided only with the single-speed reversible pump-turbine, a head loss of a waterway is caused by the water currents flowing in opposite directions in pump and turbine operations of the pump-turbine, so that the pump total head created by the pump-turbine which receives a given static head for the pump operation will necessarily be larger than the turbine net head for the turbine operation. This fact is a large obstacle to the selection of the equipment for power generation, as well as to the establishment of the operating efficiency and hence the operation plan.

Accordingly, in order to reduce the above obstacle, it is advisable to set the value of $\bar{H}p/\bar{H}t$ at approximately 1. In this invention, therefore, the value of Hp/Ht is set from this point of view, and $\bar{H}p2/\bar{H}t1$ of the booster pump 24 is to be calculated on condition that $\bar{H}p$ is equivalent to $\bar{H}t$, which is ideal for that viewpoint. Such condition may be given by $$\bar{H}p/\bar{H}t = 1.00. \qquad (10)$$

Substituting eqs. (3) and (10) into eq. (7), we obtain $$\bar{H}p2/\bar{H}t = \bar{H}p1/\bar{H}t - \bar{H}p/\bar{H}t = 1.05 - 1.00 = 0.05. \qquad (11)$$

As may be seen from eq. (11), Hp/Ht of the pump-turbine 10 is 1.00 which is larger than the value of the ideal condition, approximately 0.82, so that it is impossible to perform both pump and turbine operations with the maximum efficiency. Since the value of $\bar{H}p/\bar{H}t$, however, is smaller than the value at approximately 1.05 of eq. (3) that is used in conventional pumped storage power plants, the pump-turbine 10 can perform operation with higher efficiency as compared with the conventional manner. Moreover, as given by eq. (11), the ratio of the average pump total head of the booster pump 24 to the turbine net head $\bar{H}t$ of the pump-turbine is less than a quarter of the value 0.23 for the average ideal condition, so that the capacity of the booster pump will also be less than a quarter of the size for the ideal condition, thereby contributing to reduction in cost.

Thus, according to the method of pumping up electric power generation of this invention, there is provided the booster pump 24 besides the single-speed reversible pump-turbine 10 which rotates at the same speed in both pumping and generating operations. In generating electric power, the water current is directly led from the upper reservoir 16a to the pump-turbine 10 without passing through the booster pump 24, thereby driving the pump-turbine as a turbine. In pumping, on the other hand, water is pumped up from the lower reservoir 16b to the upper reservoir 16a by the sum of the respective pump total heads Hp and Hp2 of the pump-turbine 10 and the booster pump 24, with the booster pump 24 connected in series with the pump-turbine 10 in the passage of water sucked up by the pump-turbine 10 which is so driven as to perform a pumping operation. Thus, a high-efficiency operation of the pump-turbine 10 may be achieved.

As a result of the above considerations, it is advisable, in operating the pump-turbine 10 and the booster pump 24, to select the values of $\bar{H}p/\bar{H}t$ and $\bar{H}p2/\bar{H}t$ within a range defined by a first condition $$\bar{H}p/\bar{H}t = 0.82 \text{ and } Hp2/Ht = 0.23$$

which is hydraulically ideal for the maximum-efficiency operations of the pump-turbine 10 both as a pump and as a turbine, and a second condition $$\bar{H}p/\bar{H}t = 1.0 \text{ and } \bar{H}p2/\bar{H}t = 0.05$$

which provides a desirable result that the booster pump 24 may be reduced in size and the average of the pump total head of the pump-turbine 10 for the pump operation may be made equivalent to the average of the turbine net head for the turbine operation. Here the value of $\bar{H}p2/\bar{H}t$ is obtained by subtracting variedly assumed $\bar{H}p/\bar{H}t$ from the actual value of $\bar{H}p1/\bar{H}t$, 1.05. Selection of one among a number of sets of $\bar{H}p/\bar{H}t$ and $\bar{H}p2/\bar{H}t$ obtained in this manner depends upon the water level condition of the power plant, the ratio between the pump and turbine operation times, and how the improvement in efficiency of the pump-turbine 10, as well as the increase in size of the booster pump 24 involved therein, is evaluated from an economical point of view.

What is claimed is:

1. A method of pumping-up power generation employing a single-speed reversible pump-turbine in which the direction of a water current is reversed when the mode of operation is switched between turbine and pump operations and a booster pump, comprising generating electric power by supplying said water current directly to said pump-turbine without passing said current through said booster pump to drive said pump-turbine and a generator-motor coupled thereto at time of power generation, and pumping up water by joint operation of said pump-turbine and said booster pump, with said booster pump connected in series with a passage of said water current introduced into said pump-turbine which is driven by said generator-motor to rotate at time of pumping; the average of the pump total head of said pump-turbine for pump operation being selected at a value obtained by multiplying the average of the turbine net head affecting said pump-turbine at time of pump operation thereof by a multiplier ranging from 0.82 to 1.00, the average of the pump total head of said booster pump being selected at a value obtained by multiplying said average of the turbine net head by a value which is obtained by subtracting said multiplier from 1.05.

2. A pumping-up power generating apparatus comprising a single-speed reversible pump-turbine disposed in a waterway connecting an upper reservoir with a lower reservoir, a generator-motor coupled to said pump-turbine and functioning both as a motor and as a generator, a booster pump, a waterway means with gates for connecting said booster pump in series with a passage of a water current flowing through said pump-turbine at time of pump operation of said pump-turbine, and delivering said water current to said lower reservoir without passing said water current through said booster pump at time of turbine operation of said pump-turbine; and a driving unit for driving said booster pump; the average of the pump total head of said pump-turbine for pump operation being selected at a value obtained by multiplying the average of the turbine net head affecting said pump-turbine at time of pump operation thereof by a multiplier ranging from 0.82 to 1.00, the average of the pump total head of said booster pump being selected at a value obtained by multiplying said average of the turbine net head by a value which is obtained by subtracting said multiplier from 1.05.

* * * * *